(12) United States Patent
Rosset et al.

(10) Patent No.: US 7,501,831 B2
(45) Date of Patent: Mar. 10, 2009

(54) PROCESS FOR THE DETECTION OF A MALFUNCTION IN A DEVICE FOR WIRE SAWING AND DEVICE FOR PRACTICING SAID PROCESS

(75) Inventors: Jean-Marc Rosset, Les Tuileries (CH); Alain Foretay, Poliiez-Pittet (CH)

(73) Assignee: HCT Shaping Systems SA, Cheseaux-sur-Lausanne (CH)

( * ) Notice: Subject to any disclaimer, the term of this patent is extended or adjusted under 35 U.S.C. 154(b) by 393 days.

(21) Appl. No.: 11/474,985

(22) Filed: Jun. 27, 2006

(65) Prior Publication Data

US 2006/0292712 A1 Dec. 28, 2006

(30) Foreign Application Priority Data

Jun. 27, 2005 (EP) .................................. 05013776

(51) Int. Cl.
 *G01R 31/08* (2006.01)
(52) U.S. Cl. ........................ 324/520; 324/522
(58) Field of Classification Search ................. 324/520, 324/522; 219/69.12; 438/14
See application file for complete search history.

(56) References Cited

U.S. PATENT DOCUMENTS 5,874,678 A 2/1999 Yamamoto et al.

FOREIGN PATENT DOCUMENTS

| GB | 2315556 A * | 2/1998 |
|---|---|---|
| JP | 06-170717 | 6/1994 |
| JP | 07-205015 A | 8/1995 |
| JP | 10-180607 A | 7/1998 |
| JP | 10-193340 | 7/1998 |
| JP | 10-264007 | 10/1998 |
| JP | 2000-218498 | 8/2000 |
| JP | 2004-114249 A | 4/2004 |

\* cited by examiner

*Primary Examiner*—Vincent Q Nguyen
(74) *Attorney, Agent, or Firm*—Young & Thompson

(57) ABSTRACT

The invention relates to a process for the detection of malfunctions, in particular the detection of breakage of a wire in a wire sawing device. The process consists in applying an alternating signal to the layer of wires (4) of the sawing device and measuring the variations of voltage or current at the terminals of the layer of wires. In a modification, there are measured variations of voltage induced by the layer of wires forming a primary circuit in an antenna (9) forming the secondary circuit of a resonant system. The invention also has for its object the device for practicing the process of the invention.

11 Claims, 5 Drawing Sheets

PROCESS FOR THE DETECTION OF A MALFUNCTION IN A DEVICE FOR WIRE SAWING AND DEVICE FOR PRACTICING SAID PROCESS

The present invention relates to a process for the detection of a malfunction such as rupture of a wire, derailment of the wire, or grounding of the sawing wire in a device for wire sawing. The invention also relates to a device to detect such malfunctions in a wire sawing device.

To carry out the cutting into very thin slices of standard dimensions of blocks or ingots of material, for example of silicon, there are used wire sawing devices in which the cutting wire reaches high speeds, on the order of 5 to 25 m/s. Under certain conditions, such as for example in the presence of an irregularity in the material to be sawed, there are experienced breakages of the cutting wire which it is necessary to identify and detect in a reliable and rapid manner to avoid disturbing the production operations.

Wire sawing devices to which the present application relates generally comprise at least one region of sawing in which a wire is wound about at least two wire guides so as to form at least one layer of wires. The ingot of material to be sawed is arranged on a movable support which can be brought against the layer of moving wires. As a modification, the ingot of material is fixed on a suitable support and a distal layer of wires, which is arranged so as to be able to move in the direction of the ingot of material to be sawed. The cutting wire is adapted to move with alternating and/or continuous movement between an inlet region of the wires, for instance supplied from a wire supply bobbin and an output region, toward a receiving bobbin. Between these two regions, the wire is stretched with predetermined tension.

To facilitate the operations of cutting an ingot of material and to ensure a good surface condition, a liquid abrasive, which is for example in the case of a silicon ingot comprised by oil and silicon carbide, called slurry, is poured into the sawing region and on the layer of wires during the cutting operations.

So as to obtain a continuous cutting process, in a manner to minimize stopping of the machine, it is desirable to detect as rapidly as possible and in a certain manner any malfunction of the wire sawing device so as to be able to take suitable corrective measures.

Among the usual malfunctions that can be cited, in addition to breakage of a wire in the layer of wires, the derailing of the wire from one of the means permitting supplying the wire to the cutting region, or the case in which the wire cuts into the means on which it is mounted and produces a short circuit. The means permitting supplying of the wire to the cutting region are generally constituted by pulleys, capstans or wire guides.

The use of mechanical or optical detectors to detect the breakage of a wire or other malfunction is clearly adapted to the work environment, because the abrasive liquid or slurry poured during the cutting operations disturbs the operation of such detectors and risks damaging them.

A known solution consists of injecting a continuous current into the layer of wires and measuring the voltage at the terminals of the layer of wires. Upon breakage of the wire, the impedance or electrical resistance of the layer of wires varies and gives rise to a variation of voltage measured at the terminals of the layer.

By measuring the variations of voltage or current in the layer of wires, there are detected malfunctions such as derailment of the wire from a pulley or the cutting of a wire guide by the cutting wire. In the mentioned cases, the wire enters into contact with metallic portions of the machine, which gives rise to a short circuit and hence a variation of the electrical voltage measured at the terminals of the layer of wires.

This method has not been found to be reliable to detect breakages of the wire. Thus, the current flows not only in the layer of wires, but also in the ingot of material to be sawed and/or in the abrasive liquid, such that the electrical resistance of the layer of wires varies according to whether the layer of wires is in contact with the material to be sawed and the slurry or knot. As a result, it is difficult to attribute in a reliable manner a change in voltage to breakage of the wire during flow of continuous current.

The present invention has for its object to overcome these drawbacks, and it is characterized to this end by the characteristics set forth in basic claim 1 as concerns the process for detection of a malfunction, in particular the breakage of a wire, and by the characteristics set forth in claim 6 as to device permitting the detection of breakage of a wire in a device for wire sawing.

In particular, the process of detection according to claim 1 permits guaranteeing 100 percent detection of breakages of the wire by the use of an alternating current applied to the layer of wires.

In a modification of the process of detection, an alternating signal is applied to the layer of wires which thus comprises as the primary circuit a resonance system, and there are then measured the variations of the voltage induced in a receiving antenna forming a secondary circuit.

The use of alternating current in the wire layer and the adjustment of the secondary circuit to the resonant frequency of the signal injected in the primary circuit permits obtaining high reliability in the detection of several types of malfunction in the layer of wires such as breakage of a wire or the presence of a short circuit.

According to a desirable embodiment, the high frequency circuit applied to the primary circuit formed by the layer of wires is constituted by a signal comprising at least two components of different frequencies.

The present invention also relates to a device permitting the practice of the above process to detect effectively the breakage of a wire in a wire sawing device. This device is constituted by a signal generator to apply a high frequency signal to the layer of wires, and a measuring circuit which permits detecting variations of voltage or induced voltage or current.

In a first embodiment, the layer of wires constitutes the measuring circuit and in a second embodiment, the measuring circuit comprises a receiving antenna whose resonant frequency is adjusted to the frequency of the signal applied to the layer of wires of the wire sawing device and a circuit permitting processing of the voltage induced in the receiving antenna by the primary circuit.

Preferably, the antenna forming the secondary circuit will be disposed within the cutting region of the layer of wires.

Other advantages will become apparent from the characteristics set forth in the dependent claims and from the description hereinafter of the invention in greater detail, with the help of the drawings which schematically and by way of example illustrate an embodiment of the invention.

BREIF DESCRIPTION OF THE DRAWINGS

Figure 1:
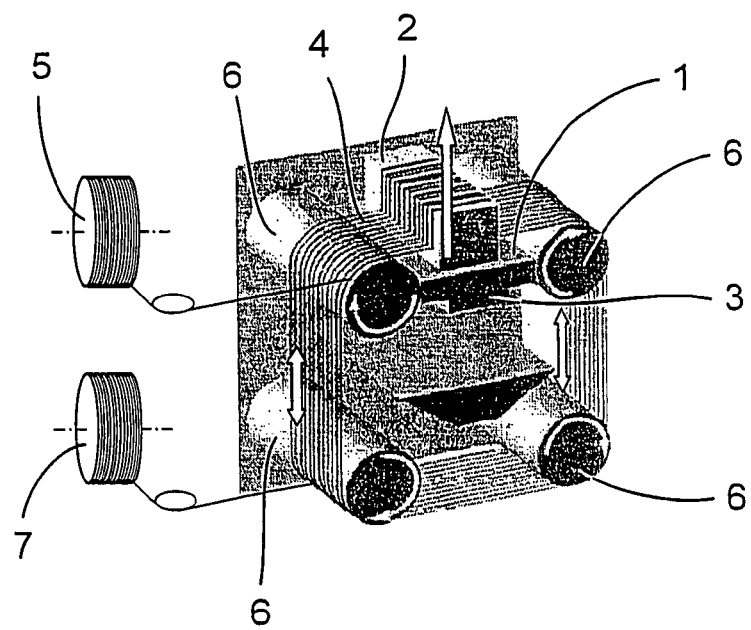
FIG. 1 shows schematically a conventional wire sawing device.

FIG. 1 shows schematically a wire sawing device which has a sawing region 1 in which an ingot 2 of the material to be sawed, for example silicon, is supported by a table 3 which can be moved in the direction of a layer of wires 4. The layer of wires 4 is for multiple winding of a wire floating from a supply bobbin 5 about several wire guides 6. At the outlet of the sawing device, the used wire is recovered on a receiving bobbin 7. The two bobbins 5 and 7 are driven by a motor spring (not shown). The wire guides can also be driven by motors. It will be noted that in such devices, the sawing of the ingot 2 of material can be carried out by alternating and/or continuous movement of the layer of wires 4.

So as to detect the breakage of the wire in such a device, there will be used the magnetic and electrical properties of the circuit constituted by the layer of wires 4 of the material to be sawed and of the slurry. A brief review of several electrical properties of conductors will permit better understanding of the following disclosure.

The impedance of an electrical conductor varies as a function of the frequency of the current which passes through it. This variation is described by the following function:

$$Z = \sqrt{R^2 + \left(wL - \frac{1}{wC}\right)^2}$$

$$ou\ w = 2.\pi.f$$

wherein:
Z: impedance [Ω]
R: resistance [Ω]
L: inductance [H]
C: capacitance [F]
w: angular frequency [rad/s]
f: frequency [Hz].

In an electric conductor subjected to continuous current, the current density is distributed uniformly into the conductor. Accordingly, when there is applied an alternating current to the same conductor, it is seen that the higher the frequency, the more the current has a tendency to flow in the periphery of the conductor. The resistance of a conductor is calculated as follows:

$$R = p\frac{1}{\pi . r^2}$$

wherein:
Row:
p: resistivity of the conductor [Ωm]
l: length of the conductor [m]
r: radius of the conductor [m]

This shows that when the cross-section of a conductor decreases, its resistance increases. Moreover, the depth of penetration of the current in a conductor is given by the following formula:

Insert equation from $$d \sim \frac{1}{\sqrt{f}}$$

which gives the more general approximation:

$$R = p\frac{1}{2\pi rd} \sim \sqrt{f}$$

Measurements of impedance carried out on the layer of wires alone, and compared with the same measurements carried out in the presence of an ingot of silicon and slurry, show that beginning with a frequency of about 150 kHz, the impedance of the layer of wires does not vary or varies only a little, whether in the presence of the material to be sawed or not. Thus, by using a high frequency signal, in place of continuous current in the layer of wires, the detection of malfunction is substantially improved, in particular the breakage of the wire and the presence of short circuits, because the influence of the ingot of the material to be sawed and of the slurry becomes negligible. A variation of the voltage of the terminals of the layer of wires or of the current flowing in the layer of wires can thus be attributed with certainty to a malfunction.

Thus, the first method of detection of malfunction in a wire sawing device consists in applying a high frequency alternating current to the layer of wires and in measuring the variations of the voltage at the terminals of the measuring circuit which constitutes the layer of wires. When a wire breaks, the resistance of the layer of wires varies and induces a variation of the voltage which can be measured and attributed to a malfunction.

A modification of the detection process consists in using the layer of wires as the primary circuit of a resonance system in measuring the current induced in a secondary circuit constituted by a receiving antenna, disposed in the cutting region of the sawing device. Upon breakage of the wire, the signal induced in the secondary circuit will abruptly vary, and it will be easily detected.

By adjusting the secondary circuit so as to make in resonant with the frequency of the current applied to the primary circuit, there is guaranteed a maximum gain between the two circuits over a fairly short range of frequencies and thus an improved detection.

Figure 2:
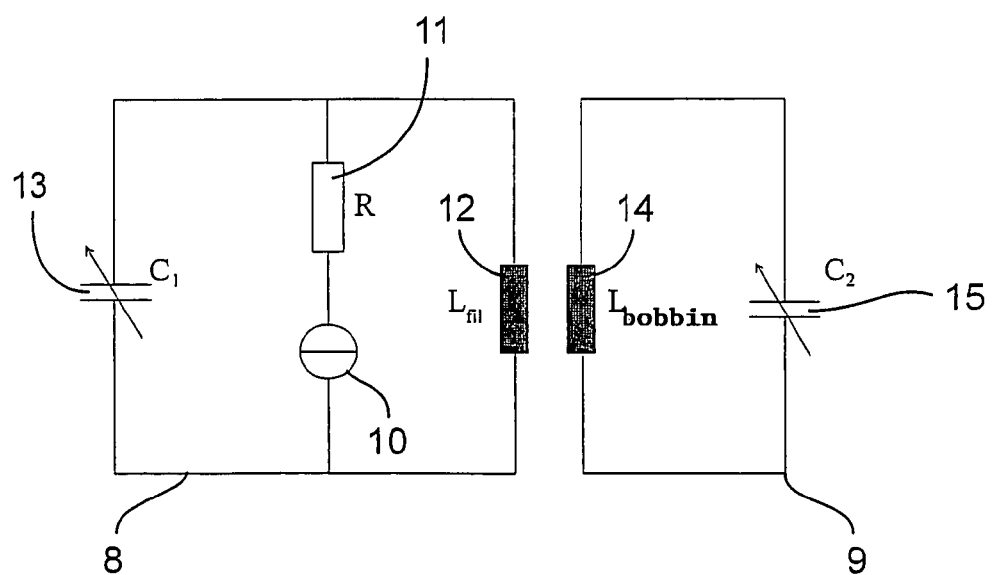
FIG. 2 shows the equivalent of the scheme of the primary and secondary circuits of the resonant system used for the detection of malfunctions according to the invention.

FIG. 2 shows schematically the equivalent circuit of the primary and secondary circuits 8 and 9. The primary circuit 8, constituted by the layer of wires 4, comprises a current source 10 having an internal resistance 11 supplying in parallel an inductance 12 of value $L_m$ and a variable condenser 3 permitting adjusting resonant frequency of the primary circuit 8.

The secondary circuit 9 used for the detection of breakage of the wire is comprised by an inductance 14, not in parallel with the variable condenser 15.

The resonant frequency of such a circuit is given by the following formula:

Penultimate line page 7 in which L is the inductance of the bobbin 14, and C is the capacitance of the condenser 15.

To determine the best frequency range to be used for the detection of malfunctions, measurements have been carried out on a sawing device, which had a layer of wires having an interval between wires comprised within the range of 0.1 mm to about 5 mm for a total length of the layer of wires on the order of 4 M.

Figure 3:
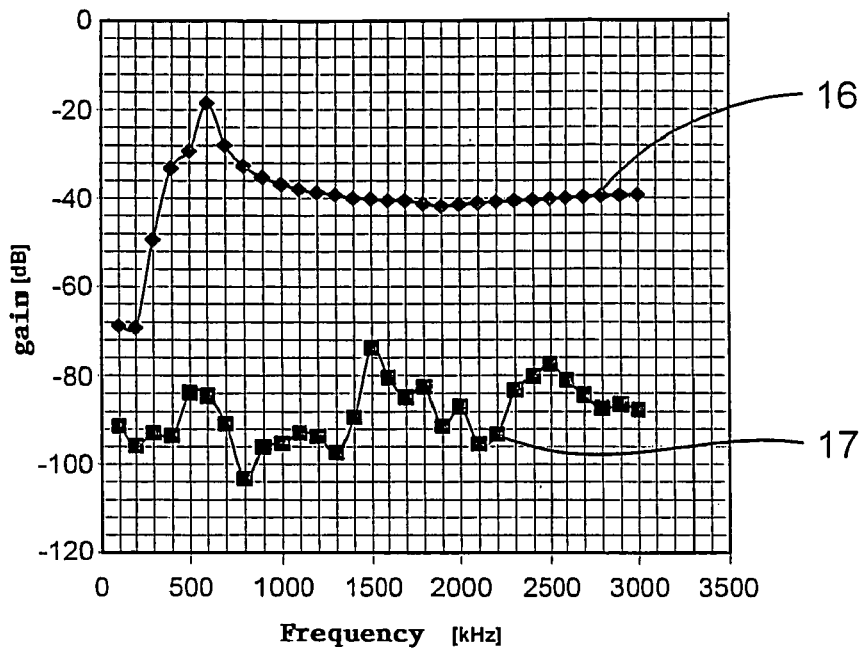
FIG. 3 shows the frequency response curve of an antenna forming the secondary circuit when the layer of wires is intact and when a wire is broken in the layer of wires.

FIG. 3 shows the frequency response curve of a receiving antenna constituted by a ferrite core about which a conductor is wound and whose equivalent diagram is identical to that of the secondary circuit 9 of FIG. 2. The upper curve 16 shows the gain of the circuit as a function of frequency when the wire is intact, while the lower curve 17 shows the gain of the circuit when a wire is cut in the layer of wires.

Figure 4:
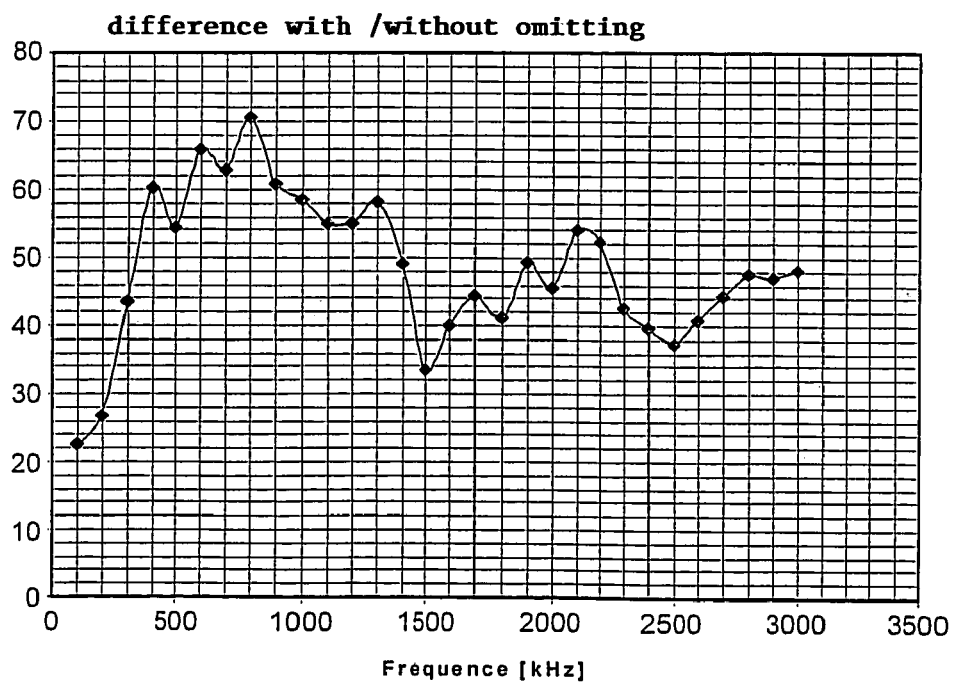
FIG. 4 shows the signal which represents the difference between the two signals illustrated in FIG. 3.

FIG. 4 itself the difference between the signal obtained by the receiving antenna when the layer of wires is supplied and when one of the wires of the layer is broken as a function of frequency.

These measurements show the best frequency range for the use of detection according to the invention is between 500 kHz and 800 kHz.

From these results, the resonant frequency has been chosen arbitrarily to be 600 kHz. Thus, the process according to the invention consists in producing an alternating signal whose frequency is comprised between 500 and 800 kHz, preferably 600 kHz, and in applying it to the layer of wires of the sawing device. These frequency values are given by way of example and in the case in which it is desired to saw silicon. For other materials, the range of frequency could be different. The layer of wires 4 thus comprises the primary circuit 8 of a resonant system. A receiving antenna forming a secondary circuit 9 is arranged immediately adjacent the layer of wires 4. An electronic circuit integrated with the antenna permits detecting variations of the voltage induced in the secondary circuit by the primary circuit. The comparison between the value of the signal measured in the receiving antenna and a predetermined threshold permits detecting malfunctions of the sawing device, such as the breakage of a wire or the presence of a short circuit, for example.

To obtain maximum gain between the primary and secondary circuits, the resonant frequency of the secondary circuit 9 is adjusted to that of the signal applied to the primary circuit.

Measurements of fading have permitted determining that the most difficult decision for the receiving antenna is at the center of the cutting zone 1 and within the layer of wires 4. It can nevertheless be located anywhere in immediate proximity to the cutting region, but with reduced performance.

A detection device adapted to wire sawing machines and permitting the practice of the process described above will now be described in greater detail. The detection device according to the invention is comprised of a current source permitting generating alternating signals at at least one given frequency and at least one measuring circuit permitting measuring variations of the voltage or of the current in the layer of wires.

As a modification, the device comprises a receiving antenna coupled to a detection circuit to measure variations of voltage induced in the antenna by the current flowing in the layer of wires, which thus forms the primary circuit of a resonant system.

Figure 5:
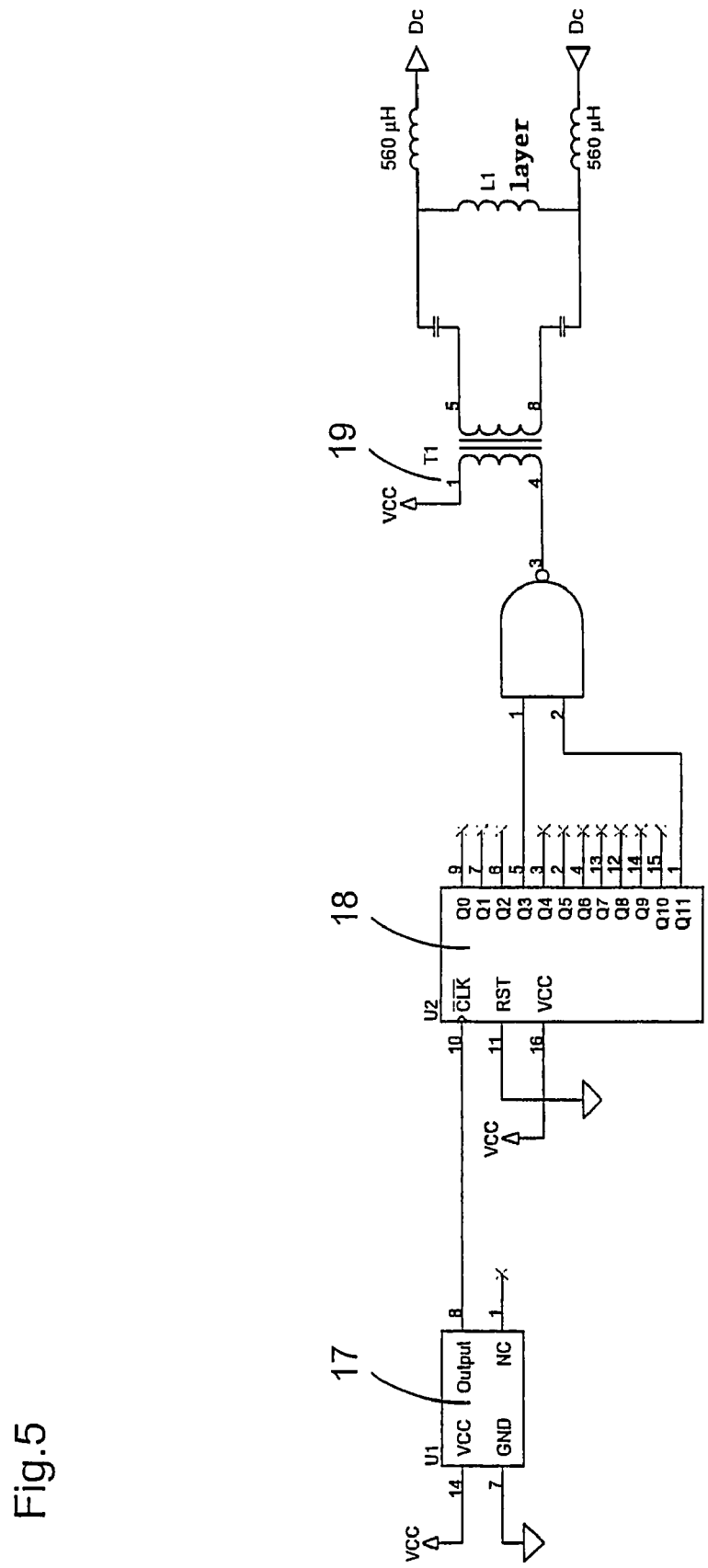
FIG. 5 is an example of a circuit permitting generating an alternating signal in the layer of wires.

Known signal generators can be used to apply the signal to the layer of wires according to the process of the present invention. By way of non-limiting example, a circuit permitting generating high frequency signal adapted to be supplied to the layer of wires 4 is shown in FIG. 5. This circuit comprises a quartz oscillator 17, followed by a frequency divider 18 and a nand port and a separation transformer or galvanic separator 19. To guarantee optimum operation, it is important that the circuit be floating, which is to say galvanically isolated.

Figure 6:
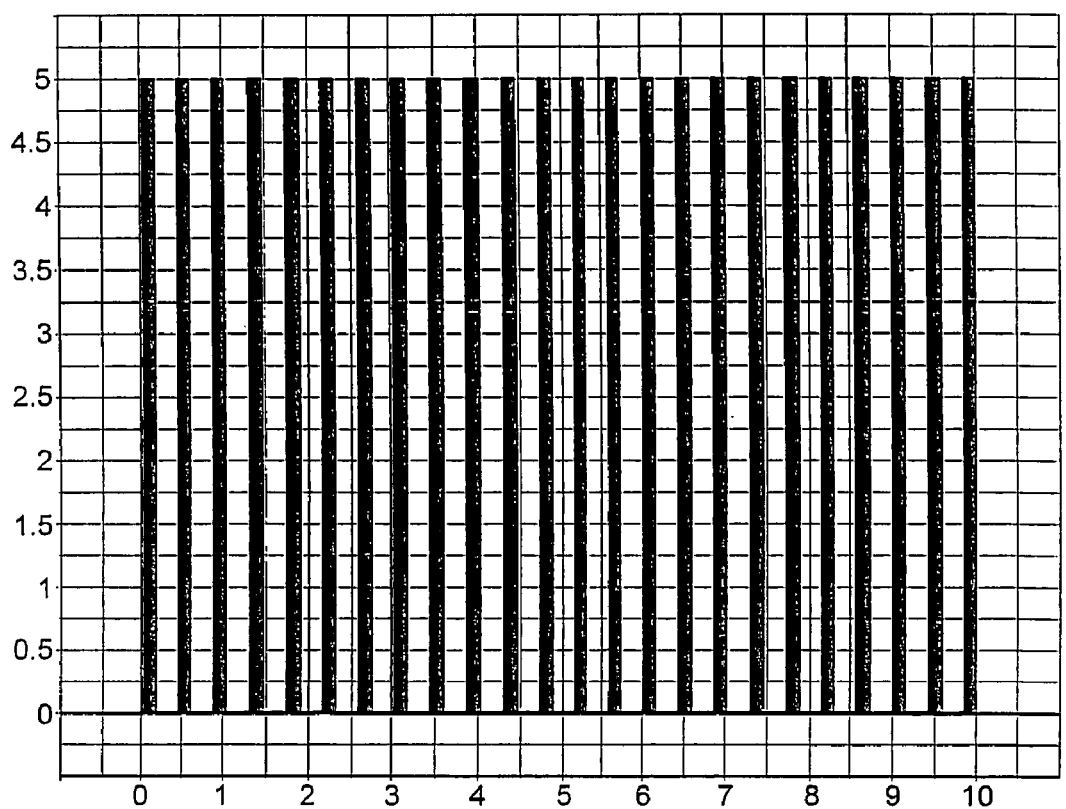
FIG. 6 is a representation of the alternating signal introduced into the layer of wires.

The generation circuit show in FIG. 5 is designed to produce a frequency of 600 kHz under 5 V. In this circuit, two frequencies are generated, and the signals are multiplied, which gives the signal shown in FIG. 6. This signal, comprised by two frequencies, comprises a first low frequency component comprised within a range between 2 kHz and 5 kHz and a second high frequency component at 600 kHz.

By playing a train of pulses to the layer of wires instead of a constant frequency signal, the other electrical and electronic members of the sawing device are less disturbed. It is evident that other modifications can be used to produce a circuit capable of generating such a signal.

As a modification, the direction device according to the invention also comprises a secondary circuit or receiving antenna whose equivalent diagram is shown in FIG. 2 whose circuit comprises an inductance 14, as well as a condenser 15? mounted in parallel. The values of inductance 14 and of capacitance 15? will be selected so as to adjust the frequency of resonance of the circuit to the frequency of resonance of the primary circuit constituted by the layer of wires. In the illustrated case, there is used a frequency of 600 kHz. To produce this receiving antenna, there can be used a ferrite core on which a conductive wire is wound and a condenser mounted in parallel.

Figure 7:
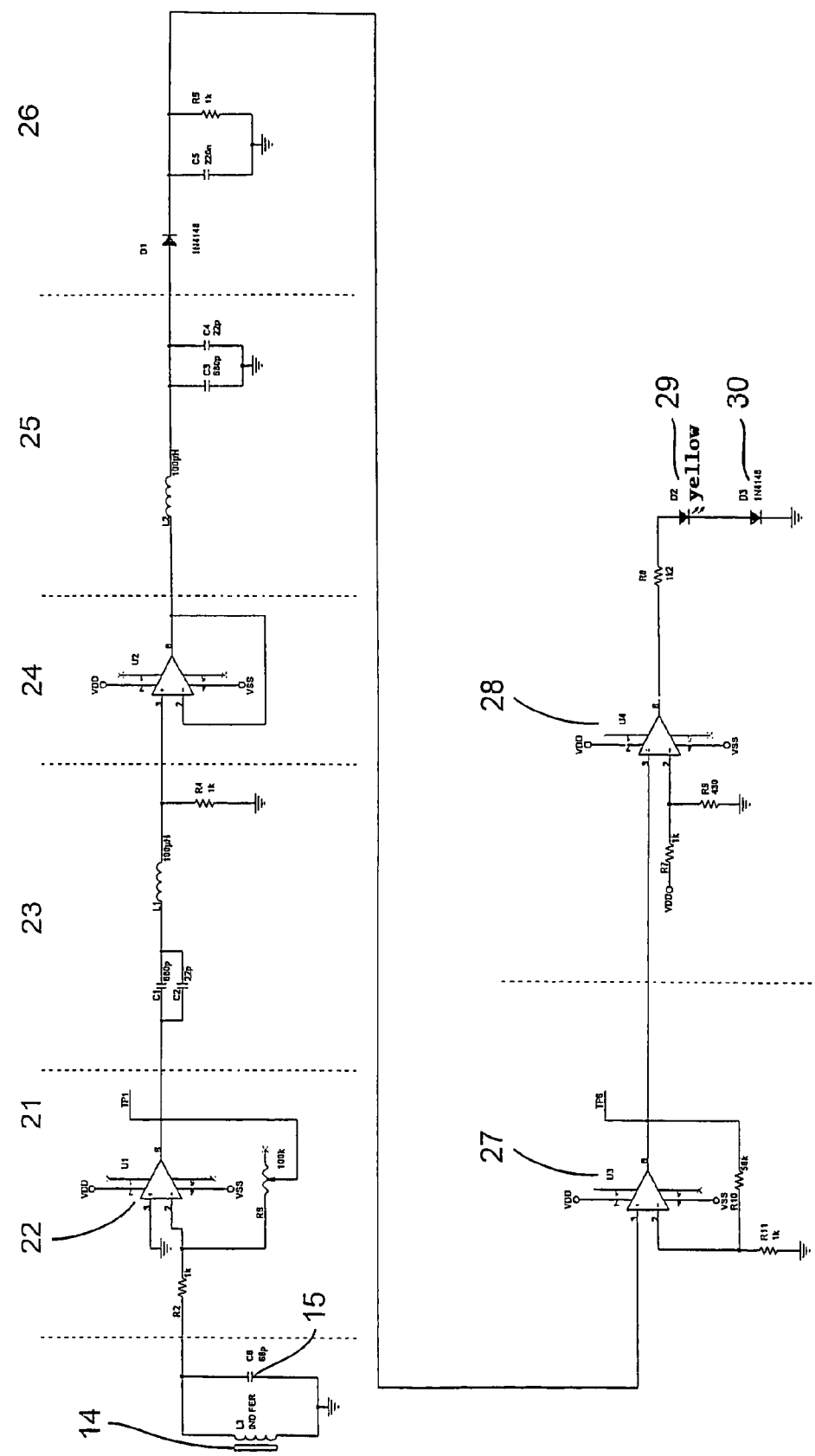
FIG. 7 is a diagram of the electronic circuit to detect variations of the voltage induced in the antenna upon breakage of a wire.

FIG. 7 shows the electrical diagram of a detection circuit which, coupled with the receiving antenna, permits measuring variations of voltage induced in the antenna or secondary circuit.

The circuit shown in FIG. 7 is comprised by a highly selective bandpass filter for the selected resonance frequency (600 kHz in the example). The signal from the antenna 14, 15 supplies a stage 21 in which the signal is first amplified with the help of a variable gain inverting amplifier 22, then passes through a bandpass filter 23, whose cutting frequency is adjusted to the value of the resonant frequency of the receiving antenna. The signal then passes through a voltage follower 24 and a lowpass filter 25 having a high quality factor and whose cutting frequency is also adjusted to the resonant frequency of the primary and secondary circuits. The signal is then rectified by a rectifier 26 and amplified with the help of a non-inverting amplifier 27 to finally supply a flip-flop 28, which permits displaying the steel condition with the help of diodes 29, 30.

This device is simple and not difficult to produce and gives excellent results. It will moreover be desirably packaged in a sealed container to resist unfavorable or hostile conditions such as those found in the cutting region of layer sawing machines. The receiving antenna provided with its rejection circuit will preferably be arranged at the center of the cutting region below the layer of wires because it is at this place that the signal induced into the antenna by the layer of wires is the strongest. It can, however, be provided to dispose the receiving antenna at another place while remaining adjacent to the cutting region.

In the preceding examples, the variation of voltage is measured either in the layer of wires directly or in the receiving end and are located adjacent to the cutting region, and it is apparent that in an equivalent manner, the current flowing in the layer of wires or the current induced in the receiving antenna could be measured to reach the same results.

We claim:

1. Process for detection of a malfunction, in particular the breakage of a wire in a wire sawing device of the type comprising at least one cutting region (1), in which a wire is wound about at least two wire guides (6) so as to form at least one layer of wires (4) movable with continuous or alternating movement and which comprises a support (3) arranged to receive an ingot of material (2), the layer of wires (4) or the support (3) being adapted to be moved so as to bring the ingot against the layer of wires (4) with the movement to be sawed, characterized in that a high frequency alternating signal is applied to the layer of wires (4) and that variations of the electrical signal in a measuring circuit are measured, the detected variations being then compared with a predetermined threshold.

2. Process according to claim 1, characterized in that the variations of the electrical signal are measured directly in the layer of wires (4).

3. Process according to claim 1, characterized in that there is measured high above the current or of the voltage induced by the primary circuit constituted by the layer of wires (4) in an antenna forming a secondary circuit arranged in the cutting region (1) of the sawing device.

4. Process according to claim 3, characterized by the fact that the signal applied to the layer of wires forming the primary circuit is comprised by at least one signal in the range of frequency between 500 kHz and 800 kHz, preferably 600 kHz, combined with signal frequencies comprised between 2 kHz and 5 kHz.

5. Process according to claim 3, characterized in that the resonant frequency of the antenna (9) forming the secondary circuit corresponds to the resonant frequency of the signal applied to the layer of wires (4).

6. A device for the detection of a malfunction, particularly the breakage of a wire, in a wire sawing device, comprising at least one cutting region (1) in which the wire is wound about at least two wire guides (6) so as to form at least one of wires (4) movable with a contiguous or alternating movement and which comprises a movable support (3) arranged so as to receive an ingot of material (2) adapted to be moved against the layer of wires (4), characterized in that it comprises a signal generator (10, 11) permitting applying an alternating signal to the layer of wires (4) and at least one measuring circuit in which variations of voltage or of current are measured.

7. The device according to claim 6, characterized in that the measuring circuit is constituted by the layer of wires (4).

8. The device according to claim 6, characterized in that the measuring circuit comprises at least one antenna (14, 15) arranged adjacent the cutting region (1) and coupled to a signal processing circuit permitting variations of the voltage or current induced in the antenna (14, 15) by the primary circuit formed by the layer of wires (4).

9. The device according to claim 8, characterized by the fact that the antenna (14, 15) forming the secondary circuit is arranged at the center of the sawing region (1), below the layer of wires (4).

10. The device according to claim 8, characterized in that the antenna is constituted by a ferrite core surrounded by a conductive wire and a variable condenser (15) to permit adjusting the resonant frequency of the antenna to the frequency of the signal applied to the layer of wires (4) forming the primary circuit.

11. The device according to claim 8, characterized in that the detection circuit coupled to the antenna (14, 15) comprises at least one amplifier (22, 28) of the signal and at least one bandpass filter (23, 25) whose cutting frequency corresponds to the resonant frequency of the antenna (14, 15) and at least one flip-flop (28) connected to means (29, 30) for displaying conditions.

* * * * *